United States Patent [19]
Dassler et al.

[11] Patent Number: 5,678,844
[45] Date of Patent: Oct. 21, 1997

[54] SUPPORTING MOUNT FOR A SHOCK DAMPER OF A MOTOR VEHICLE

[75] Inventors: Juergen Dassler, Stuttgart; Horst Swinnen, Wolfschlugen, both of Germany

[73] Assignee: Mercedes-Benz AG, Germany

[21] Appl. No.: 664,199

[22] Filed: Jun. 10, 1996

[30] Foreign Application Priority Data

Jun. 9, 1995 [DE] Germany .................. 195 21 128.6

[51] Int. Cl.[6] .................................................. B60G 15/06
[52] U.S. Cl. .............................................. 280/668; 280/673
[58] Field of Search ..................................... 280/668, 673, 280/716

[56] References Cited

U.S. PATENT DOCUMENTS

| | | | |
|---|---|---|---|
| 4,681,304 | 7/1987 | Hassan | 267/220 |
| 4,699,530 | 10/1987 | Satoh et al. | 280/668 |
| 4,804,169 | 2/1989 | Hassen | 280/668 |
| 4,981,287 | 1/1991 | Cothenet | 280/668 |
| 5,211,380 | 5/1993 | Germano | 280/668 |
| 5,275,389 | 1/1994 | Pinch et al. | 280/668 |
| 5,467,971 | 11/1995 | Hurtubise et al. | 280/668 |

FOREIGN PATENT DOCUMENTS 0 065 235 A1  11/1982  European Pat. Off. .
1194397      11/1959  France .

Primary Examiner—Kenneth R. Rice
Attorney, Agent, or Firm—Evenson, McKeown, Edwards & Lenahan P.L.L.C.

[57] ABSTRACT

In a supporting mount for a shock damper with a spring-mounted damper cylinder of a motor vehicle, the stops for an elastic mounting of the piston rod of the shock damper and for the spring path of the damper cylinder are to be designed and installed in a manner which is functionally optimal and expedient in terms of assembly. For this purpose, individual stops are combined with one another by means of mutual snapping-in.

5 Claims, 1 Drawing Sheet

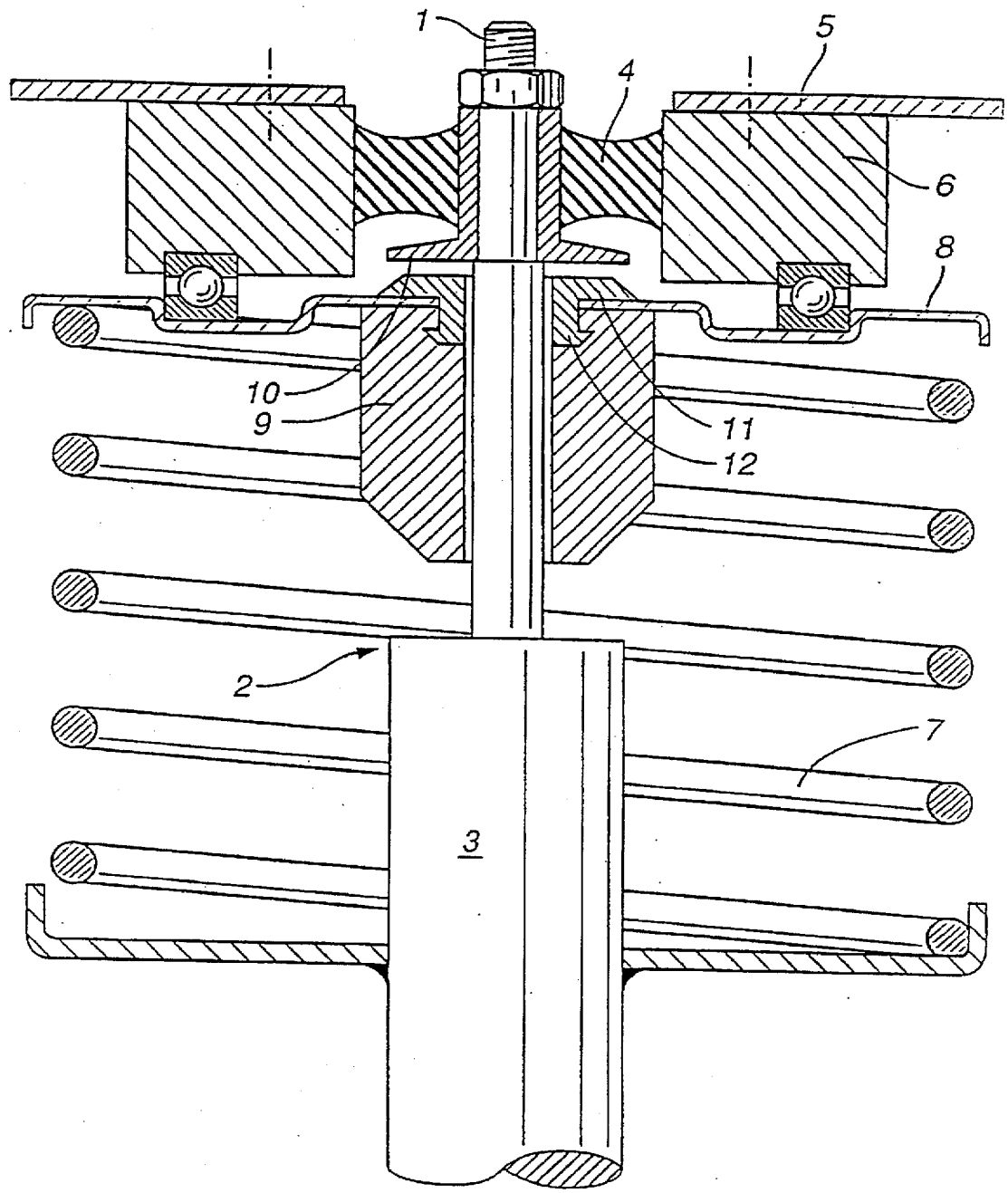

5,678,844

SUPPORTING MOUNT FOR A SHOCK DAMPER OF A MOTOR VEHICLE

BACKGROUND AND SUMMARY OF THE INVENTION

The invention relates to a supporting mount for a shock damper with a spring-mounted damper cylinder of a motor vehicle.

A supporting mount is known, for example, from EP 0,065,235 A1. In such a supporting mount, the elastic mounting of the piston rod of the shock damper has the function of damping so-called micromovements which are not damped in the cylinder of the shock damper. In order that, in the case of relatively large oscillation deflections, the actual shock damper can come into effect, the oscillation path defined for micromovements by the elastic mounting of the piston rod must be subject to narrow limits. This limitation takes place through the use of stops in both directions of the oscillation movement. These stops must be of elastic design in order to avoid knocking noise and impact pulses which disturb driving comfort.

The supporting mount according to the type generally described above also comprises a region in which the cylinder of the shock damper is mounted directly opposite the fixture of the supporting mount in the direction of the shock damper. The abovementioned fixture is generally the body of the vehicle. The part of the supporting mount receiving the damper cylinder is in this case a spring plate which is mounted so as to be rotatable relative to the body. Braced between this spring plate and the damper cylinder is a helical spring which is a part of the vehicle suspension. In order to avoid excessive rebounds of the vehicle wheel connected to the damper cylinder, an elastic stop is provided on the spring plate, which stop limits the rebound path of the damper cylinder. This is the second elastic stop.

An object of the invention is to provide an advantageously producible connection of the first and second elastic stop to the spring plate in a supporting mount of the type generally described above. Further advantages are obtained by setting the deformation behavior of the two stops independently of one another to correspond to the respective requirements.

These and other objects have been achieved by providing a supporting mount for a shock damper of a motor vehicle, the shock damper having a spring-mounted damper cylinder with a piston rod which extends through an opening in a spring plate and which is elastically mounted on a body portion of the motor vehicle, the supporting mount comprising a rigid stop arranged on the piston rod and facing a first side of the spring plate; a first elastic stop arranged to extend through the opening in the spring plate from the first side to a second side of the spring plate opposite the first side, the first elastic stop having a contact surface facing the rigid stop; a second elastic stop arranged on the second side of the spring plate and having a contact surface facing said damper cylinder; wherein the first elastic stop is configured with a collar on the second side of the spring plate which engages the second elastic stop.

An essential advantage of the invention results from the fact that the first elastic stop can be designed in terms of material to meet the operational requirements placed on it. These requirements consist in the fact that this stop allows an elastically soft initial deformation with a progressively increasing rigidity and a deformation path which is, in total, limited as narrowly as possible. A short deformation path is necessary in order not to put the elastic mounting of the piston rod in the vehicle body at risk in terms of strength.

The first elastic stop is designed as an annular part with a collar molded on in an undercut-like manner. This collar can be designed specifically to be snapped into a central opening in the spring plate receiving this elastic first stop. A shape tapering conically to the free end of the collar is particularly suitable for this purpose. The second elastic stop is designed in the form of a hollow cylinder. This second stop can be snapped onto the collar, which has been passed through the central opening in the spring plate to attach the first stop, in a simple manner by means of a correspondingly shaped groove. Such a mutual connection between the first and second elastic stop permits an extremely simple attachment of these two parts to the spring plate.

In terms of material, the second elastic stop, just like the first elastic stop, can be adapted to the requirements placed specifically on it. This means that the second elastic stop can comprise a material of higher elastic properties compared to the material of the first elastic stop. The material of the second elastic stop is, in particular, also more greatly compressible than the material of the first elastic stop.

Other objects, advantages and novel features of the present invention will become apparent from the following detailed description of the invention when considered in conjunction with the accompanying drawings.

BRIEF DESCRIPTION OF THE DRAWING

The drawing shows a sectional view of a supporting mount for a shock damper according to a preferred embodiment of the present invention.

DETAILED DESCRIPTION OF THE DRAWING

The piston rod 1 of a shock damper 2 with a damper cylinder 3 is mounted in an elastic mount 4 on the body 5 of a vehicle by means of a fixture part 6.

The damper cylinder 3 is supported against the fixture part 6 by means of a helical spring 7. The helical spring rests on the body side, on a spring plate 8 mounted so as to be rotatable relative to the fixture part 6. A stop buffer, which in this case is denoted as second elastic stop 9, serves to prevent excessive rebound of a motor vehicle wheel connected to the damper cylinder 3. This excessive rebound is prevented by the fact that as the damper cylinder 3 moves upwardly in contact with the second elastic stop 9, the second elastic stop progressively builds up an opposing force as it is compressed between the damper cylinder 3 and the spring plate 8.

The purpose of the elastic mounting of the piston rod 1 is to damp micromovements which cannot be absorbed by the shock damper 2 inside the damper cylinder 3. In contrast, oscillations going beyond micromovements can be absorbed by the shock damper 2. The oscillation amplitude of the elastic mounting 4 of the piston rod 1 therefore has to have narrow limits. In order to achieve this limitation, the elastic mount 4 is provided with a rigid stop 10 which is operatively connected to this elastic mount 4. In the case of a rebound, i.e. in the event of an oscillating movement of the piston rod 1 from the damper cylinder 3 towards the elastic mount 4, the rigid stop 10 strikes against the elastic region of the elastic mount 4 and thus limits its deflection path in the rebound direction.

In order to limit the deflection of the elastic mount 4 in the event of outward deflection, i.e. in the event of a movement of the piston rod 1 in the direction of the damper cylinder 3, the rigid stop 10 strikes against a first elastic stop 11. This first elastic stop 11 is made of a material with a degree of soft initial deformation, which material becomes steeply progressively harder with an increasing deformation path and, in total, allows only a relatively small deformation path. These properties of the material of the first stop 11 are necessary for good functionality. An explanation of this has already been given above in the Background and Summary of the Invention.

The region of the first elastic stop 11 which is arranged above the spring plate 8 and is deformed in the event of an impact of the rigid stop 10 is advantageously formed as a disc which rests as flatly as possible against the spring plate 8. A collar 12 is molded onto this flat region adjacent a groove extending in an undercut-like manner. At its free end, this collar can taper conically over a relatively large length in order thus to allow the collar to be snapped into the spring plate 8 in a simple manner. Of course, the side of the first elastic stop 11 facing the rigid stop 10 can also have a curved or contoured surface in a further embodiment of the invention.

At its end facing the spring plate 8 radially on the inner side, the second elastic stop 9 is designed in the form of a hollow cylinder, having a groove which is shaped in an undercut-like manner for mating engagement with the collar 12 of the first elastic stop 11, such that the second elastic stop 9 can be snapped onto the collar 12.

Due to the conical taper of the collar 12 of the first elastic stop 11, the snap-on connection between the two elastic stops (11, 9) can also be carried out in a simple manner during assembly.

Due to the separation of the two elastic stops (11, 9), the second elastic stop 9 can also be produced from the material which is best suited to this purpose in terms of function.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A supporting mount for a shock damper of a motor vehicle, the shock damper having a spring-mounted damper cylinder with a piston rod which extends through an opening in a spring plate and which is elastically mounted on a body portion of the motor vehicle, said supporting mount comprising:

a rigid stop arranged on the piston rod and facing a first side of the spring plate;

a first elastic stop arranged to extend through said opening in the spring plate from said first side to a second side of the spring plate opposite the first side, the first elastic stop having a contact surface facing said rigid stop;

a second elastic stop arranged on said second side of the spring plate and having a contact surface facing said damper cylinder;

wherein said first elastic stop is configured with a collar on said second side of the spring plate which engages said second elastic stop.

2. A supporting mount according to claim 1, wherein the first elastic stop and the collar each have an annular configuration.

3. A supporting mount according to claim 1, wherein the collar is configured such that the first elastic stop is snapped into the opening in the spring plate.

4. A supporting mount according to claim 1, wherein the second elastic stop is configured with an undercut for mating engagement with the collar of the first elastic stop.

5. A supporting mount according to claim 4, wherein the undercut is configured such that the second elastic stop is snapped onto the collar of the first elastic stop.

* * * * *